United States Patent
Oishi et al.

(10) Patent No.: US 9,450,706 B2
(45) Date of Patent: Sep. 20, 2016

(54) COMMUNICATION APPARATUS AND PACKET TRANSFER METHOD

(71) Applicant: Hitachi, Ltd., Tokyo (JP)

(72) Inventors: Yuji Oishi, Tokyo (JP); Takashi Isobe, Tokyo (JP); Takeki Yazaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/650,438

(22) PCT Filed: Nov. 20, 2013

(86) PCT No.: PCT/JP2013/081250
§ 371 (c)(1),
(2) Date: Jun. 8, 2015

(87) PCT Pub. No.: WO2014/119094
PCT Pub. Date: Aug. 7, 2014

(65) Prior Publication Data
US 2015/0318958 A1    Nov. 5, 2015

(30) Foreign Application Priority Data
Jan. 30, 2013   (JP) .................... 2013-015245

(51) Int. Cl.
*H04L 1/08* (2006.01)
*H04L 12/823* (2013.01)
*H04L 29/06* (2006.01)

(52) U.S. Cl.
CPC .............. *H04L 1/08* (2013.01); *H04L 69/163* (2013.01); *H04L 47/323* (2013.01)

(58) Field of Classification Search
CPC ...... H04L 1/08; H04L 69/163; H04L 47/323
See application file for complete search history.

(56) References Cited

U.S. PATENT DOCUMENTS

| 2004/0255219 A1 | 12/2004 | Grossman, IV et al. |
| 2010/0235702 A1 | 9/2010 | Tanimoto et al. |
| 2012/0106427 A1* | 5/2012 | Nakae ................. H04L 12/1868 370/312 |

FOREIGN PATENT DOCUMENTS

| JP | 2005-006340 A | 1/2005 |
| JP | 2010-213150 A | 9/2010 |
| JP | 5636574 B2 | 10/2014 |

(Continued)

OTHER PUBLICATIONS

T. Blanton et al., A Conservative Selective Acknowledgment (SACK)-based Loss Recovery Algorithm for TCEP, Apr. 2003.

(Continued)

*Primary Examiner* — Jianye Wu
(74) *Attorney, Agent, or Firm* — Mattingly & Malur, PC

(57) ABSTRACT

To efficiently retransmit discarded packets and to reduce discarded location storage capacity, it is provided a communication apparatus to be coupled to a network, the communication apparatus being configured to: transmit data to a correspondent communication apparatus coupled to the network; receive an acknowledgement transmitted from the correspondent communication apparatus; monitor whether or not a storage capacity shortage for storing discarded locations of transmitted data in the correspondent communication apparatus; and retransmit data by setting a retransmission priority for discarded locations in a case of the storage capacity shortage.

15 Claims, 15 Drawing Sheets

(56) References Cited

FOREIGN PATENT DOCUMENTS

| JP | 5636574 B2 | 12/2014 |
| WO | 2012/066824 A1 | 5/2012 |

OTHER PUBLICATIONS

S. Floyd et al., An Extension to the Selective Acknowledgment (SACK) Option for TCP Status of this Memo, Jul. 2000.

M. Mathis et al. TCP Selective Acknowledgment Option, Oct. 1996.

International Search Report of PCT/JP2013/081250; English translation of Written Opinion and Notification of Reason for Refusal for JP2013-015245.

T. Blanton et al., A Conservative Selective Acknowledgment (SACK)-based Loss Recovery Algorithm for TCP, Apr. 2003.

M. Mathis et al. TCP Selective Acknowledgment Options, Oct. 1996.

\* cited by examiner

| ACK: 1000 | PACKET SIZE: 100 | | | | | | 15 |
|---|---|---|---|---|---|---|---|
| NUMBER | 1 | 2 | 3 | 4 | 5 | 6 | ... |
| RECEIVED LEFT EDGE | 1100 | 1300 | 1700 | 2500 | 3100 | 3700 | ... |
| RECEIVED RIGHT EDGE | 1200 | 1500 | 2000 | 2800 | 3600 | 4000 | ... |
| (NUMBER OF PACKETS) | (1) | (1) | (2) | (5) | (3) | (1) | ... |
| PRIORITY | 1 | 1 | 0 | 0 | 0 | 1 | ... |

Fig. 4A

| ACK: 1000 | PACKET SIZE: 100 | | | | | | 15 |
|---|---|---|---|---|---|---|---|
| NUMBER | 1 | 2 | 3 | 4 | 5 | 6 | ... |
| RETRANSMISSION LEFT EDGE | 1000 | 1200 | 1500 | 2000 | 2800 | 3600 | ... |
| RETRANSMISSION RIGHT EDGE | 1100 | 1300 | 1700 | 2500 | 3100 | 3700 | ... |
| (NUMBER OF PACKETS) | (1) | (1) | (2) | (5) | (3) | (1) | ... |
| PRIORITY | 1 | 1 | 0 | 0 | 0 | 1 | ... |

Fig. 4B

| NUMBER | 1 | 2 | 3 | ... |
|---|---|---|---|---|
| RECEIVED LEFT EDGE | 1100 | 1700 | 2100 | ... |
| RECEIVED RIGHT EDGE | 1200 | 2000 | 3000 | ... |
| (NUMBER OF PACKETS) | (1) | (5) | (1) | ... |

140a

| NUMBER | 1 | 2 | ... |
|---|---|---|---|
| RECEIVED LEFT EDGE | 1100 | 1700 | ... |
| RECEIVED RIGHT EDGE | 1200 | 3000 | ... |
| (NUMBER OF PACKETS) | (1) | (1) | ... |

140b

| 210 | POINTER | 1 | 2 | 6 | 3 | 5 | 4 | ... |
|---|---|---|---|---|---|---|---|---|
| 211 | NUMBER OF PACKETS | 1 | 1 | 1 | 2 | 3 | 5 | ... |
| 212 | PRIORITY | 6 | 5 | 4 | 3 | 2 | 1 | ... |

30

| ACK: 1000 | PACKET SIZE: 100 | | | | | | |
|---|---|---|---|---|---|---|---|
| 120 NUMBER | 1 | 2 | 3 | 4 | 5 | 6 | ... |
| 121 RECEIVED LEFT EDGE | 1100 | 1300 | 1700 | 2500 | 3100 | 3700 | ... |
| 122 RECEIVED RIGHT EDGE | 1200 | 1500 | 2000 | 2800 | 3600 | 4000 | ... |
| 123 (NUMBER OF PACKETS) | (1) | (1) | (2) | (5) | (3) | (1) | ... |
| 124 PRIORITY | 6 | 5 | 3 | 1 | 2 | 4 | ... |

*Fig. 13A*

| ACK: 1000 | PACKET SIZE: 100 | | | | | | |
|---|---|---|---|---|---|---|---|
| 120 NUMBER | 1 | 2 | 3 | 4 | 5 | 6 | ... |
| 125 RETRANSMISSION LEFT EDGE | 1000 | 1200 | 1500 | 2000 | 2800 | 3600 | ... |
| 126 RETRANSMISSION RIGHT EDGE | 1100 | 1300 | 1700 | 2500 | 3100 | 3700 | ... |
| 123 (NUMBER OF PACKETS) | (1) | (1) | (2) | (5) | (3) | (1) | ... |
| 124 PRIORITY | 6 | 5 | 3 | 1 | 2 | 4 | ... |

*Fig. 13B*

COMMUNICATION APPARATUS AND PACKET TRANSFER METHOD

INCORPORATE BY REFERENCE

The present application claims priority from Japanese patent application JP 2013-015245 filed on Jan. 30, 2013, the content of which is hereby incorporated by reference into this application.

BACKGROUND OF THE INVENTION

This invention relates to a communication apparatus.

In cloud computing, a user uses the computer resources of an external data center rather than those at the location where he/she is present. The data center stores data to be used by the user, and hence the data is frequently transferred between the user's location and the data center.

Data centers are located widely around the world, and in some cases may not be in the same country as the user's location. For example, it is common to utilize an overseas data center having low usage charges.

When utilizing an overseas data center, the data transfer rate may be slow. For communication to/from a distant data center, the round trip time (RTT), which is the time from a packet being transmitted until a response is received, is large. In such a case, there is a problem in that based on an ordinary communication method the communication speed is slow.

There is known WO 2012/066824 A1 as the related art in this technical field. In WO 2012/066824 A1, there is the following disclosure: "To prevent cases in which, when a proxy apparatus is used between a transmission terminal and a reception terminal, and tail end data is received from the transmission terminal but the proxy apparatus fails immediately thereafter, transmission is complete at the transmission terminal but reception is not complete at the reception terminal, provided is means for not sending an ACK response in a case where a data packet is received in the proxy apparatus in a state in which there is no current transmission data waiting for an ACK or current reception data waiting to be ordered, sending an ACK as a response for the data packet received immediately previously in a case where a data packet is received in the proxy apparatus in a state in which there is current transmission data waiting for an ACK or current reception data waiting to be ordered, and sending an ordinary ACK as a response in a case where an ACK is received from the reception terminal side and there is no current transmission data waiting for an ACK or current reception data waiting to be ordered."

SUMMARY OF THE INVENTION

In WO 2012/066824 A1, retransmission efficiency is improved by using a NACK for a retransmission request. However, in a case where a NACK is used, the communication terminals on both the transmission side and the reception side need to support the communication method disclosed in WO 2012/066824 A1. Meanwhile, actual network includes not only terminals supporting the communication method disclosed in WO 2012/066824 A1 but also terminals using a common communication method. This means that communication based on a common communication method also occurs.

For example, in RFC 3517, a retransmission control method is defined that uses a selective acknowledgement (SACK). However, in high-speed communication, the following problems occur, and such problems cannot be handled by the method defined in RFC 3517.

In the method defined in RFC 3517, discarded packets are retransmitted by the reception terminal notifying the transmission terminal of the packet number of the correctly received packets, and the transmission terminal detecting the locations that are not notified. Therefore, the reception terminal and the transmission terminal store the reception locations or the discarded locations of the packets.

In a case where the packet discard ratio in the network is high, and in particular, when discards occur non-consecutively, the number of discarded locations to be stored increases, and hence a large storage capacity is required in order to store the discarded locations. Depending on the implementation method, the storage capacity of the reception terminal and the transmission terminal may be limited. Therefore, when the amount of discards becomes a predetermined amount or more, the reception terminal may be short of storage capacity, which may prevent newly transmitted packets from being received.

Therefore, it is an object of this invention to efficiently retransmit discarded packets and to reduce discarded location storage capacity.

The representative one of inventions disclosed in this application is outlined as follows. There is provided a communication apparatus to be coupled to a network, the communication apparatus being configured to: transmit data to a correspondent communication apparatus coupled to the network; receive an acknowledgement transmitted from the correspondent communication apparatus; monitor whether or not a storage capacity shortage for storing discarded locations of transmitted data in the correspondent communication apparatus; and retransmit data by setting a retransmission priority for discarded locations in a case of the storage capacity shortage.

According to the representative embodiment of this invention, the amount of discarded location information can be reduced, and the data transfer throughput can be improved. Problems, configurations, and effects other than those described above are made clear based on the following description of embodiments.

BRIEF DESCRIPTION OF THE DRAWINGS

FIGS. 4A and 4B are each an explanatory diagram for illustrating a configuration example of a retransmission management table according to the first embodiment.

FIGS. 13A and 13B are each an explanatory diagram for illustrating a configuration example of a retransmission management table according to the second embodiment.

DETAILED DESCRIPTION OF THE PREFERRED EMBODIMENTS

First Embodiment

Figure 1:
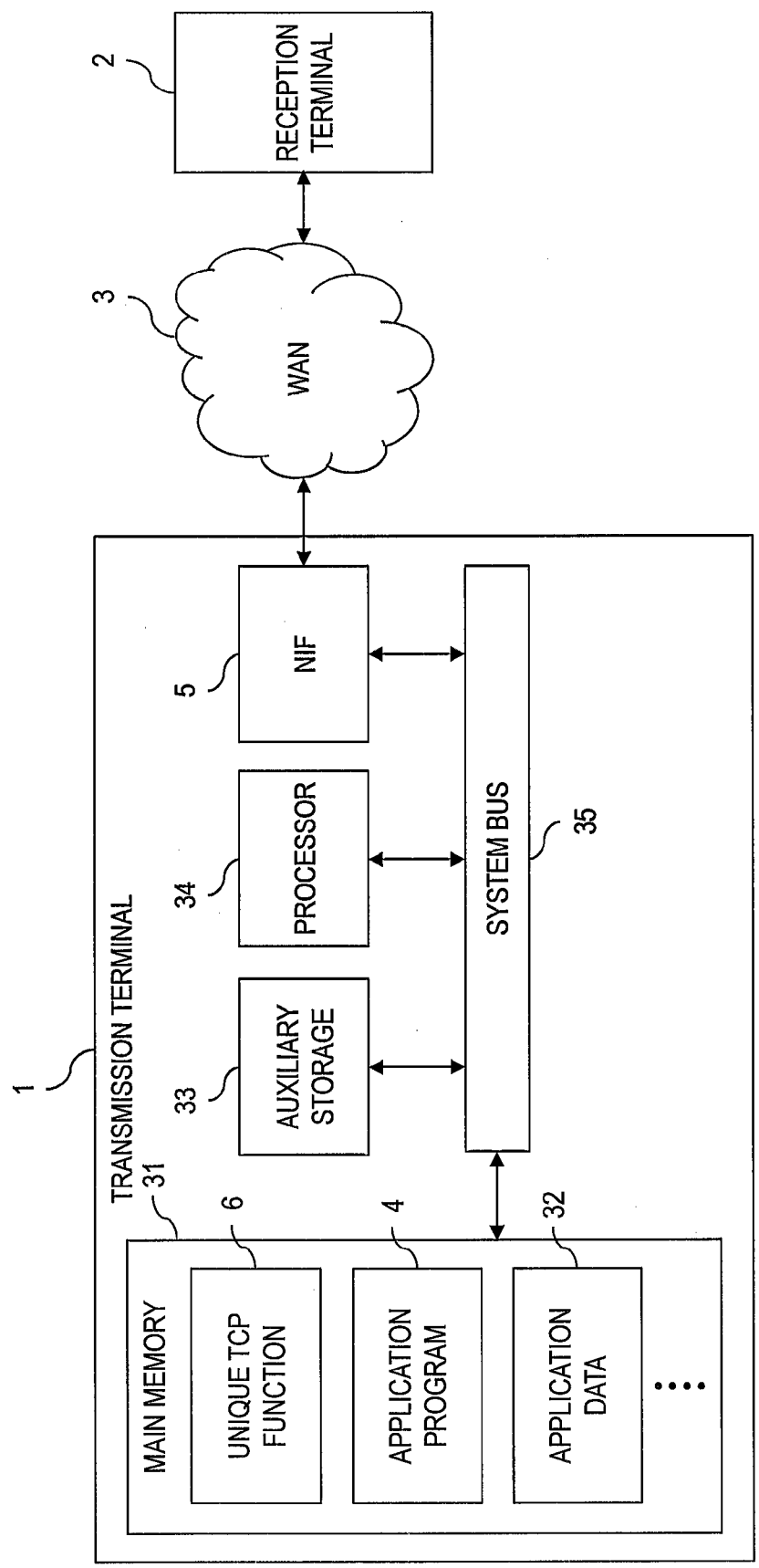
FIG. 1 is a diagram illustrating a configuration of a system according to a first embodiment of this invention.

FIG. 1 is a diagram for illustrating a configuration of a system according to a first embodiment of this invention.

The system according to the first embodiment includes a transmission terminal 1, a WAN 3, and a reception terminal 2.

The transmission terminal 1 includes at least a network interface (NIF) 5, a main memory 31, an auxiliary storage 33, a processor 34, and a system bus 35 coupling each of those devices to each other for transferring data. The main memory 31 temporarily stores programs and data. The auxiliary storage 33 stores programs and data. The processor 34 is configured to execute programs stored in the main memory 31.

The main memory 31 stores a program for a unique TCP function 6, an application program 4, application data 32, and the like.

The auxiliary storage 33 is, for example, a non-volatile storage device such as a flash memory or a magnetic storage device. The auxiliary storage 33 stores programs to be executed by the processor 34 and data to be used during program execution. More specifically, the programs executed by the processor 34 are read from the auxiliary storage 33, loaded into the main memory 31, and executed by the processor 34.

The processor 34 is configured to execute the application program 4 using the application data 32.

Further, the unique TCP function 6 controls transmission data by the processor 34 executing a predetermined program. The unique TCP function 6 transmits the transmission data to the network interface 5, and the network interface 5 transmits the transmission data to the WAN 3.

It should be noted that although FIG. 1 is an illustration of an example in which all of the components of the unique TCP function 6 are configured by software, a part or all of the components of the unique TCP function 6 may be implemented in a dedicated LSI by a logic circuit or in the network interface 5.

The programs to be executed by the processor 34 are provided to the transmission terminal 1 via removable media (CD-ROM, flash memory, etc.) or a network, and stored in the auxiliary storage 33, which is a non-transitory storage medium. Therefore, the transmission terminal 1 may include an interface (e.g., optical disc drive and USB port) for reading removable media.

Figure 2:
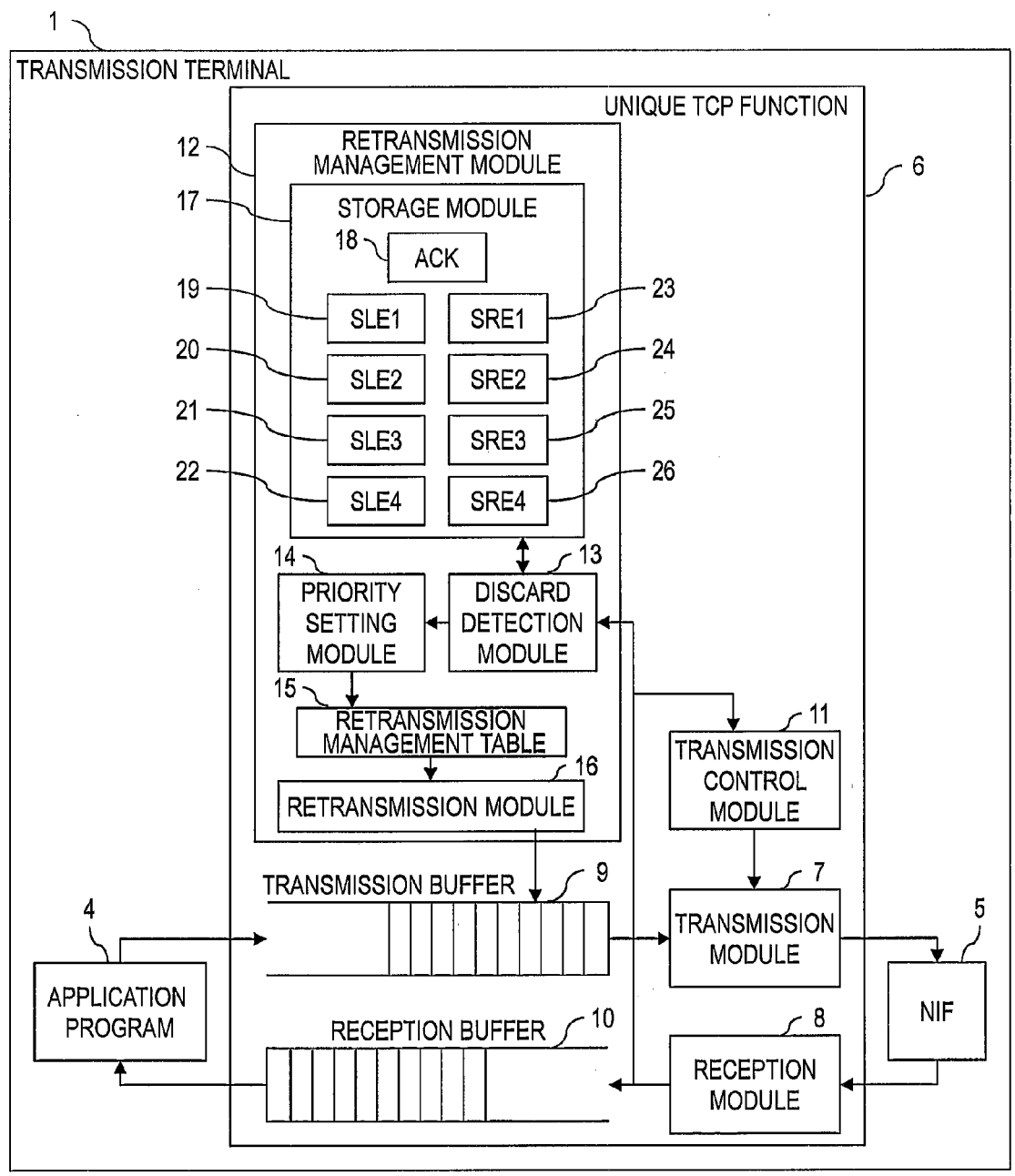
FIG. 2 is a function block diagram of a transmission terminal according to the first embodiment.

FIG. 2 is a function block diagram of the transmission terminal 1 according to the first embodiment. In particular, FIG. 2 is an illustration of the unique TCP function 6 in detail.

The transmission terminal 1 includes the application program 4, the network interface 5, and the unique TCP function 6.

The unique TCP function 6 includes a transmission module 7, a reception module 8, a transmission buffer 9, a reception buffer 10, a transmission control module 11, and a retransmission management module 12.

The transmission module 7 is configured to control transmission of data from the network interface 5 to the WAN 3. The transmission control module 11 is configured to control the amount and order of the data transmitted from the transmission module 7 by controlling the timing at which the transmission module 7 reads the data from the transmission buffer 9. The transmission buffer 9 temporarily stores the data transmitted from the application program 4. The transmission module 7 reads the data to be transmitted of the data stored in the transmission buffer 9. The data stored in the transmission buffer 9 is used for retransmitting discarded packets.

The reception module 8 is configured to receive data that has arrived at the network interface 5 from the WAN 3, and write the received data to the reception buffer 10 in order to ensure the conformity, such as the order, of the received data. The reception buffer 10 temporarily stores data to be transferred to the application program 4. The retransmission management module 12 is configured to detect the discarding of a packet, and control retransmission of discarded packets.

The retransmission management module 12 includes a discard detection module 13, a priority setting module 14, a retransmission management table 15, a retransmission module 16, and a storage module 17. The discard detection module 13 is configured to detect correctly received locations or discarded locations from a received acknowledgement (ACK) packet, and to detect the occurrence of large-scale discards. The storage module 17 stores a value of the acknowledgement that is sent back as a response from the reception terminal 2. The priority setting module 14 is configured to set a priority for the retransmission packets. The retransmission management table 15 is a table for managing correctly-received packets or discarded packets. The retransmission module 16 is configured to refer to the retransmission management table 15 and retransmit a packet based on the set priority. In order to store an ACK value and four SACK blocks, the storage module 17 includes storage areas, namely, an ACK memory 18, SLE 1 to 4 memories 19 to 22, and SRE 1 to 4 memories 23 to 26. Those storage areas correspond to the fields of a SACK packet illustrated in FIG. 3.

The reception terminal 2 uses a common communication method, for example, the standard method defined in RFC 2018. In RFC 2018, a SACK is used in addition to an ACK. An ACK indicates a location up to which locations have been correctly received continuously from the start of the sequence. A SACK notifies the transmission terminal 1 of received locations even if a gap has occurred in the received locations due to a discard.

Figure 3:
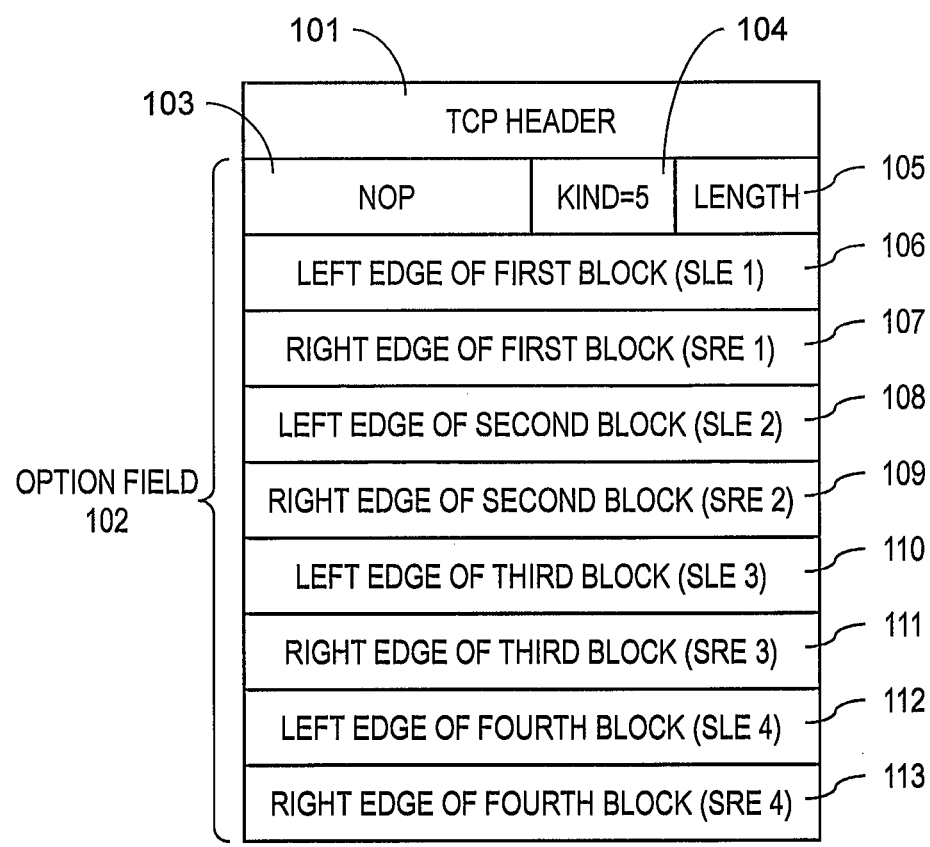
FIG. 3 is an explanatory diagram of a packet format of a SACK.

FIG. 3 is an explanatory diagram of a packet format of an ACK that includes a SACK.

A SACK is added to an option field 102 of a TCP header 101. The SACK specifies a NOP (no operation) 103 indicating not to do anything, followed by a kind 104 and a length 105, as well as a left edge (SACK Left Edge: SLE) 106 and a right edge (SACK Right Edge: SRE) 107 of a first block. The right edge 107 is a value obtained by adding 1 to the sequence number of the received data, indicating the sequence number of the packet that the reception terminal 2 requests the transmission terminal 1 to transmit next. For example, in the SACK corresponding to the packet with the sequence number 1000, which has a packet length of 100, the left edge is 1000 and the right edge is 1100, because the packet includes the data from sequence numbers 1000 to 1099.

In a case where a plurality of packets have been discarded, in order to notify of a plurality of SACK blocks, a plurality of block left edges (108, 110, 112) and right edges (109, 111, 113) are specified. It should be noted that due to a limitation in the option length, a maximum of 4 blocks can be transmitted, and hence the latest 4 blocks are notified, including SACK blocks notified in the past.

FIGS. 4A and 4B are each an illustration of a configuration example of the retransmission management table 15 according to the first embodiment, for showing a state after the priority has been set.

The retransmission management table 15 stores for each entry an entry number 120, a left edge 121 and a right edge 122 of the received sequence number, and a retransmission priority 124. It should be noted that the retransmission management table 15 may also include a field for a number of packets 123. The number of packets 123 indicates the number of retransmission packets for the retransmission location of that entry. It should be noted that the number of packets 123 can be calculated from the sequence number and packet length, and hence is not an essential part of the retransmission management table 15.

The retransmission management table 15 stores the sequence numbers that have been received by the reception terminal 2, and hence the packets that are not listed in the retransmission management table 15 are the packets to be retransmitted. Specifically, the packets in the sequence from the received right edge of an entry before a given entry to the received left edge of that entry are the packets to be retransmitted. However, for the entry number 1, the packets in the sequence from the ACK number to the received left edge are the packets to be retransmitted. The number of packets is the value obtained by dividing a difference between those sequence numbers by the packet length (e.g., 100).

Further, the retransmission management table 15 may have a structure like that shown in FIG. 4B. In the retransmission management table 15 shown in FIG. 4B, the left edge 121 and the right edge 122 of the received location are not managed like the left edge 121 and the right edge 122 are in the retransmission management table 15 shown in FIG. 4A, and a left edge 125 and a right edge 126 of a location to be retransmitted are managed. Therefore, the packets of the locations stored in the retransmission management table 15 shown in FIG. 4B may be retransmitted.

In the retransmission management table 15 shown in FIG. 4A, the left edge 121 and the right edge 122 of the received location are managed, and hence the processing load during acknowledgement packet reception can be reduced. On the other hand, in the retransmission management table 15 shown in FIG. 4B, the left edge 125 and the right edge 126 of the location to be retransmitted are managed, and hence the processing load during retransmission can be reduced.

Before describing the retransmission priority setting in more detail, the need for the priority setting is described.

Figure 5:
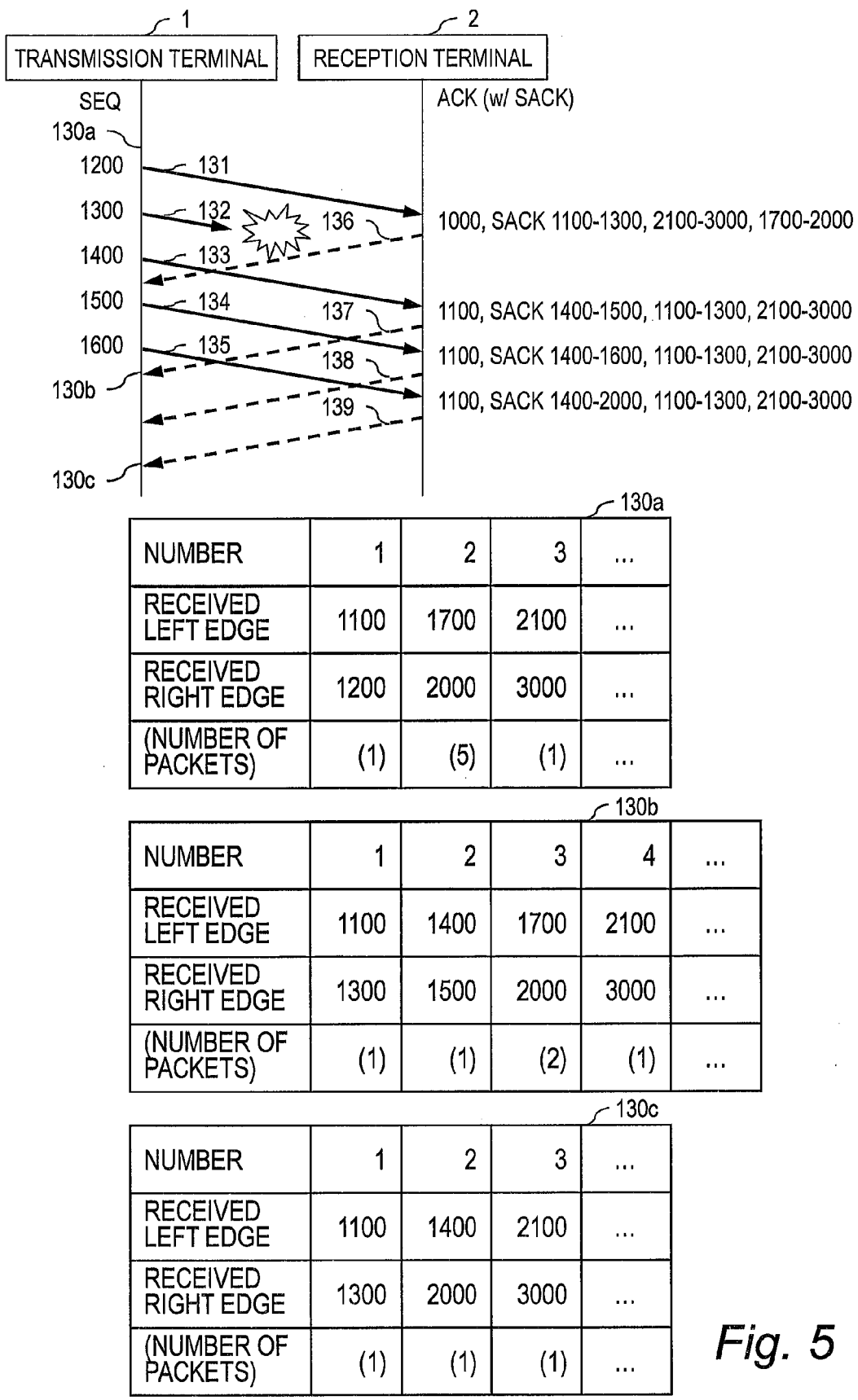
FIG. 5 is a diagram for illustrating a communication sequence in a case of retransmission in order of sequence number without setting a retransmission priority.

Generally, packets are retransmitted in ascending order of sequence number. FIG. 5 is an illustration of an example of retransmission in order of sequence number without setting a retransmission priority. The reception terminal 2 stores the same information as the information in a retransmission management table 130a of the transmission terminal 1. Therefore, the storage capacity of the retransmission management table 15 of the transmission terminal 1 is proportional to a discarded location storage capacity of the reception terminal 2. It should be noted that depending on implementation, the structure of the retransmission management table 15 of the transmission terminal 1 and the structure of the discarded location storage area of the reception terminal 2 do not need to be the same.

The transmission terminal 1 has retransmitted five packets (131 to 135) in order from sequence number 1200 as a retransmission block with the entry number 2. However, the packet with the sequence number 1300 has been discarded (132). The reception terminal 2 sends an ACK or an ACK including a SACK as a response relating to the reception location. First, because the reception terminal 2 has received the packet with the number 1200, the reception terminal 2 sends an ACK including a SACK 1100-1300 as a response (136). The transmission terminal 1 receives this response, and rewrites the right edge of the entry 1 to 1300. Next, because the packet with the sequence number 1300 has been discarded, the reception terminal 2 receives the packet with the sequence number 1400 (133). Then, the reception terminal 2 sends an ACK including a SACK 1400-1500 and a SACK 1100-1300 as a response (137).

The transmission terminal 1 receives this response, and stores a new entry 1400-1500 in the retransmission management table 15 (130b). Next, the reception terminal 2 receives packets with the sequence numbers 1500 and 1600 (134 and 135). As a result of those packets, the packets with the sequence numbers 1500 to 1700 are received. Consequently, entry numbers 2 and 3 are connected, and an ACK including a SACK 1400-2000 is sent as a response (138 and 139). The transmission terminal 1 receives this ACK, joins the entries 2 and 3 of the retransmission management table 130b, and newly stores 1400-2000 in the entry 2 (130c).

In this case, the number of entries in the retransmission management tables 130a and 130c is unchanged before and after this retransmission, although the number temporarily increases (130b). More specifically, if a discard again occurs during retransmission, the number of entries in the retransmission management table 15 does not decrease.

Figure 6:
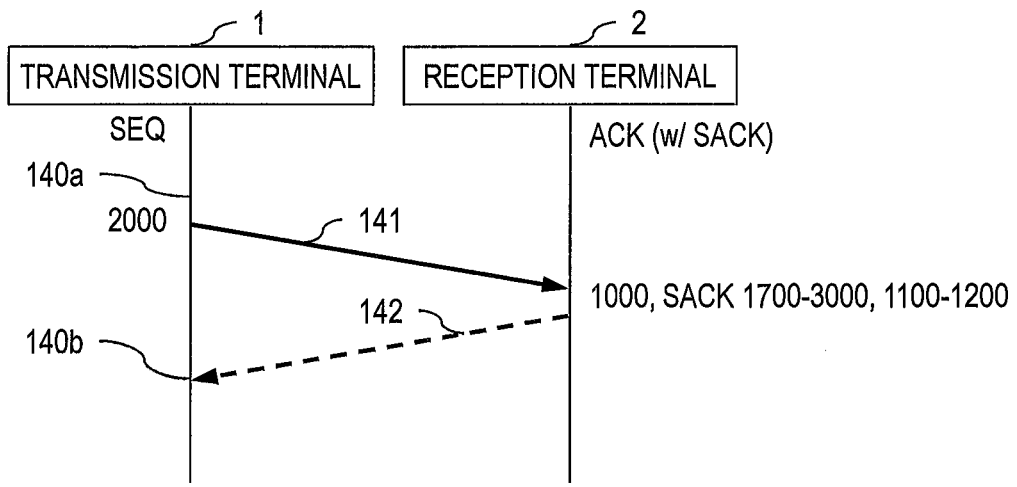
FIG. 6 is a diagram for illustrating a communication sequence in a case of retransmission performed without relying on the order of sequence numbers.

On the other hand, FIG. 6 is an illustration of an example in which retransmission is performed without relying on the order of the sequence numbers.

The transmission terminal 1 retransmits the packet with the sequence number 2000 as a block with the entry number 3 without relying on the order of the sequence numbers (141). In a case where transmission of the packet with the sequence number 2000 is successful, the reception terminal 2 sends an ACK including a SACK 1700-3000 as a response (142).

In a case where the transmission terminal 1 receives this ACK, the transmission terminal 1 joins the entries 2 and 3, and newly stores 1700-3000 in the entry 2 (140b). Therefore, the number of entries in the retransmission management table 15 can be decreased. Even if retransmission of the packet with the sequence number 2000 fails, the number of entries does not change.

Thus, the number of entries cannot be decreased in a case where a retransmission packet is again discarded. If the probability of the retransmission packet again being discarded is constant, the probability of even one packet in the retransmission block being discarded increases in proportion to the number of packets in that block. Therefore, for an entry having a small number of packets in the retransmission block, the number of entries in the retransmission management table 15 is likely to decrease. On the other hand, for an entry having a large number of packets in the retransmission block, the number of entries in the retransmission management table 15 is less likely to decrease.

As can be seen from the examples described above, in a case where the discarded location storage capacity in the reception terminal 2 is limited, preferentially retransmitting the locations having a smaller number of retransmission packets rather than retransmitting in order of sequence number enables the capacity for storing the discarded locations by the reception terminal 2 to be reduced. In particular, it is desirable to preferentially retransmit blocks having a smaller number of packets because this avoids an increase in storage capacity due to the discarding of retransmission packets.

Figure 7:
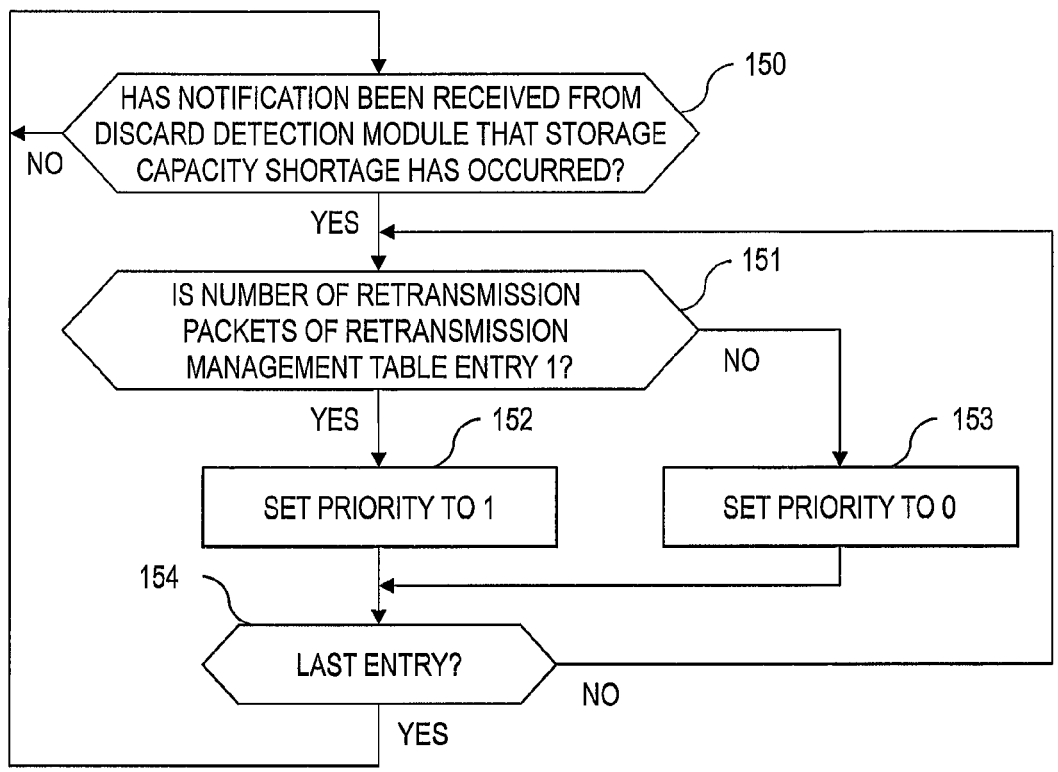
FIG. 7 is a flowchart for illustrating processing executed by a priority setting module according to the first embodiment.

In the first embodiment, an example is described in which a retransmission block having one packet is preferentially retransmitted. FIG. 7 is a flowchart for illustrating processing executed by the priority setting module 14 according to the first embodiment. The priority setting module 14 waits until being notified that the discard detection module 13 has detected that a shortage has occurred in the discarded location storage capacity in the reception terminal 2 (150). In a case where the priority setting module 14 is notified that a shortage has occurred in the discarded location storage capacity, the priority setting module 14 checks the entries of the retransmission management table 15 in order (151). As a result, in a case where the number of packets to be retransmitted is one, the priority setting module 14 sets the priority to 1 (152), and in a case where the number of packets to be retransmitted is not one, the priority setting module 14 sets the priority to 0 (153). Then, the priority setting module 14 determines whether or not processing of the last entry is complete (154). In a case where processing of the last entry is complete, the priority setting module 14 finishes the processing.

FIGS. 4A and 4B are each an explanatory diagram of a configuration example of the state in the retransmission management table 15 after the priority has been set. Entries having one packet are set to a priority of 1, and entries having two or more packets are set to a priority of 0.

Next, a method of detecting a shortage of the discarded location storage capacity in the reception terminal 2 is described.

Figure 8:
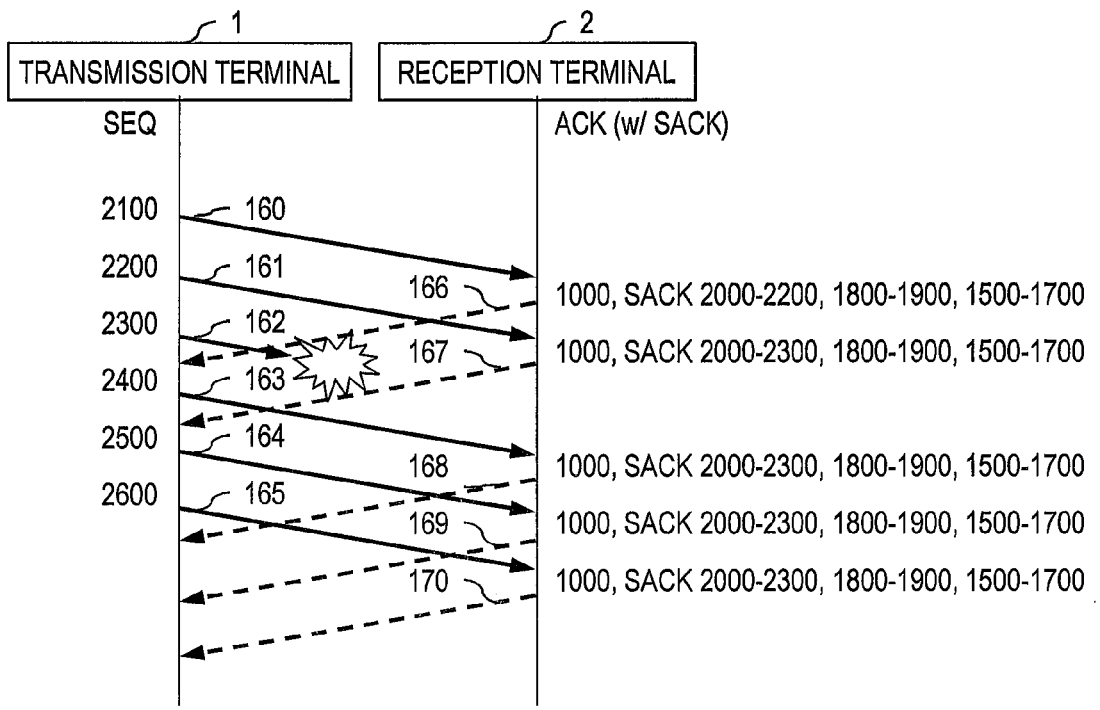
FIG. 8 is a diagram for illustrating a communication sequence in a case of storage capacity shortage.

FIG. 8 is an illustration of a communication sequence in a case of shortage of the storage capacity.

In the example illustrated in FIG. 8, before the illustrated sequence, the reception terminal 2 receives the packets with the sequence numbers 0 to 1000, and receives the packets with the sequence numbers 1500, 1600, 1800, and 2000, between which there are several discards. In this state, the capacity of the reception terminal 2 for storing discarded locations is full, and hence no new discards can be stored.

The transmission terminal 1 transmits the packet with the sequence number 2000, and then the packets with the sequence numbers 2100 and 2200 (160 and 161). The reception terminal 2 receives those two packets. Those packets do not cause the number of discarded locations to increase, and hence the reception terminal 2 transmits an ACK including a SACK 2000-2200 (166) and an ACK including a SACK 2000-2300 (167).

Then, the packet with the sequence number 2300 that is transmitted next is discarded (162), and the packet with the sequence number 2400 is received by the reception terminal 2 (163). At this point, the reception terminal 2 has reached its storage capacity upper limit, and hence cannot store a new discarded location. Therefore, although the reception terminal 2 does transmit an ACK because the reception terminal 2 has received a packet, the reception terminal 2 cannot store new packet receptions, and hence the reception terminal 2 sends as a response an ACK packet including the same SACK as that of the immediately previous ACK packet. In other words, an ACK including the SACK 2000-2300 is transmitted (168). The reception terminal 2 subsequently transmits the same ACK each time a new packet is received (169 and 170).

More specifically, in a case where the transmission terminal 1 receives an ACK packet including the same SACK as that of the immediately previous ACK packet, the transmission terminal 1 knows that the reception terminal 2 has reached the upper limit of its discarded location storage capacity.

Figure 9:
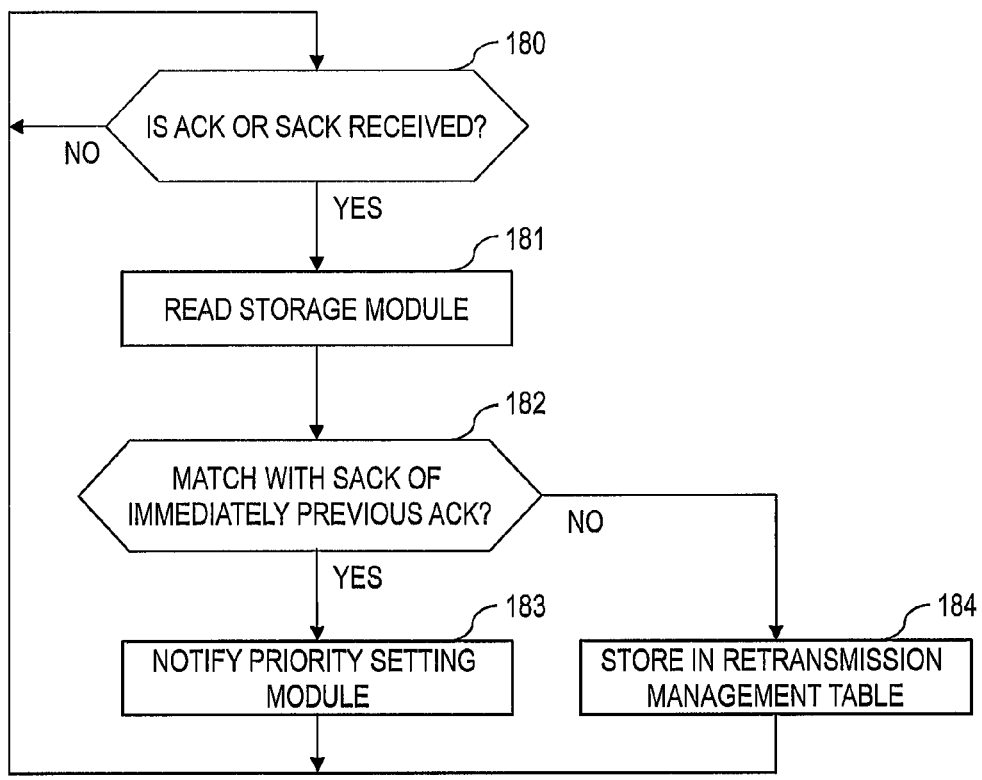
FIG. 9 is a flowchart for illustrating processing executed by a discard detection module according to the first embodiment.

FIG. 9 is a flowchart for illustrating processing executed by the discard detection module 13 according to the first embodiment.

In a case where the discard detection module 13 receives an ACK packet or an ACK packet including a SACK (180), the discard detection module 13 reads the ACK memory 18, the SLE 1 to 4 memories 19 to 22, and the SRE 1 to 4 memories 23 to 26 from the storage module 17 (181), and determines whether or not there is a match with the SACK of the ACK packet received immediately previously (182).

In a case where the storage content of the storage module 17 and the SACK of the ACK packet received immediately previously match, the discard detection module 13 notifies the priority setting module 14 (183). On the other hand, in a case where the storage content of the storage module 17 and the SACK of the ACK packet received immediately previously do not match, the discard detection module 13 stores the points that have changed in the retransmission management table 15 (184).

The retransmission module 16 checks the entries of the retransmission management table 15, and retransmits the packets in descending order of the priority of the entries. For entries with the same priority, the packets are retransmitted in ascending order of sequence number.

As described above, in the first embodiment, discarded packets are efficiently retransmitted, which enables the discarded location storage capacity to be reduced, and data transfer throughput to be improved. Further, a high priority is set for discarded locations having a small number of packets to be retransmitted, and hence a shortage in the discarded location storage capacity of the reception terminal 2 can be alleviated. In addition, the priority of discarded locations having one packet to be retransmitted is set high, and the priority of discarded locations having two or more packets to be retransmitted is set to 0. Consequently, the packets of the discarded locations having one packet to be retransmitted can be preferentially retransmitted, which enables retransmission to be easily controlled.

Second Embodiment

In a second embodiment of this invention, a method of setting the priority in a different manner from that in the first embodiment is described.

In the first embodiment, only retransmission blocks having one packet are retransmitted, but in the second embodiment, blocks having more than one packet (e.g., 2 or 3 packets) are also retransmitted. However, because the priority of blocks having a smaller number of packets is set higher, blocks having one packet are retransmitted first. In a case where packets are consecutively discarded, the method according to the second embodiment is effective. It should be noted that in the second embodiment, only the differences from the above-mentioned first embodiment are described. Configurations and processes that are the same as in the first embodiment are denoted with the same reference numerals, and a description thereof is omitted here.

Figure 10:
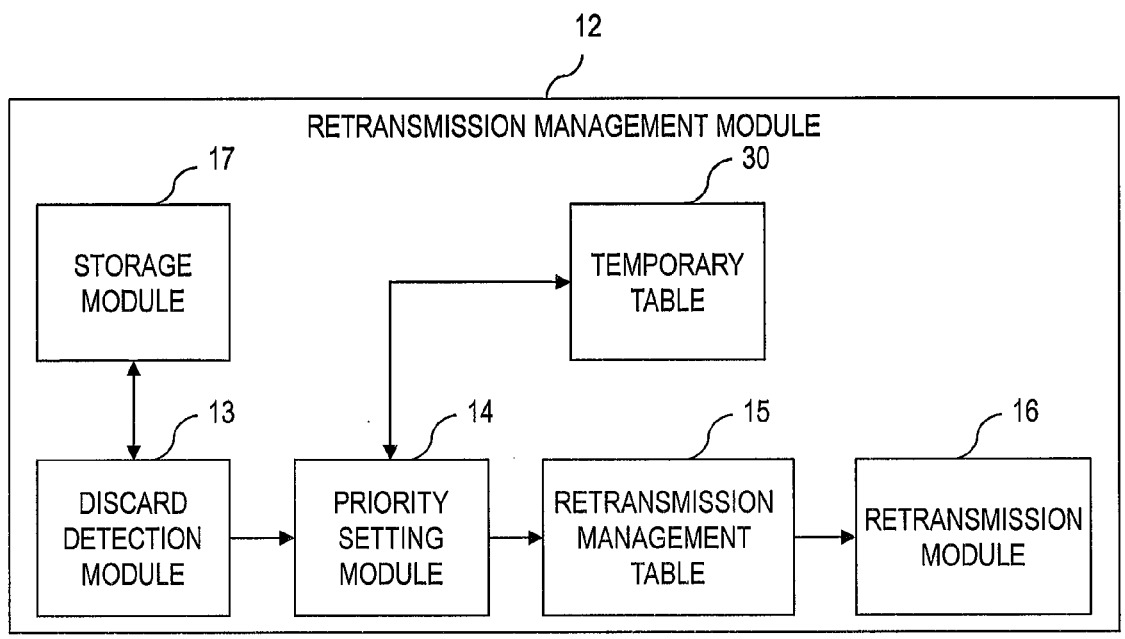
FIG. 10 is a function block diagram of a retransmission management module according to a second embodiment.

FIG. 10 is a function block diagram of the retransmission management module 12 according to the second embodiment.

The retransmission management module 12 according to the second embodiment includes, in addition to the configurations of the first embodiment, a temporary table 30 for rearranging data in order to set the priority.

Figures 11, 12:
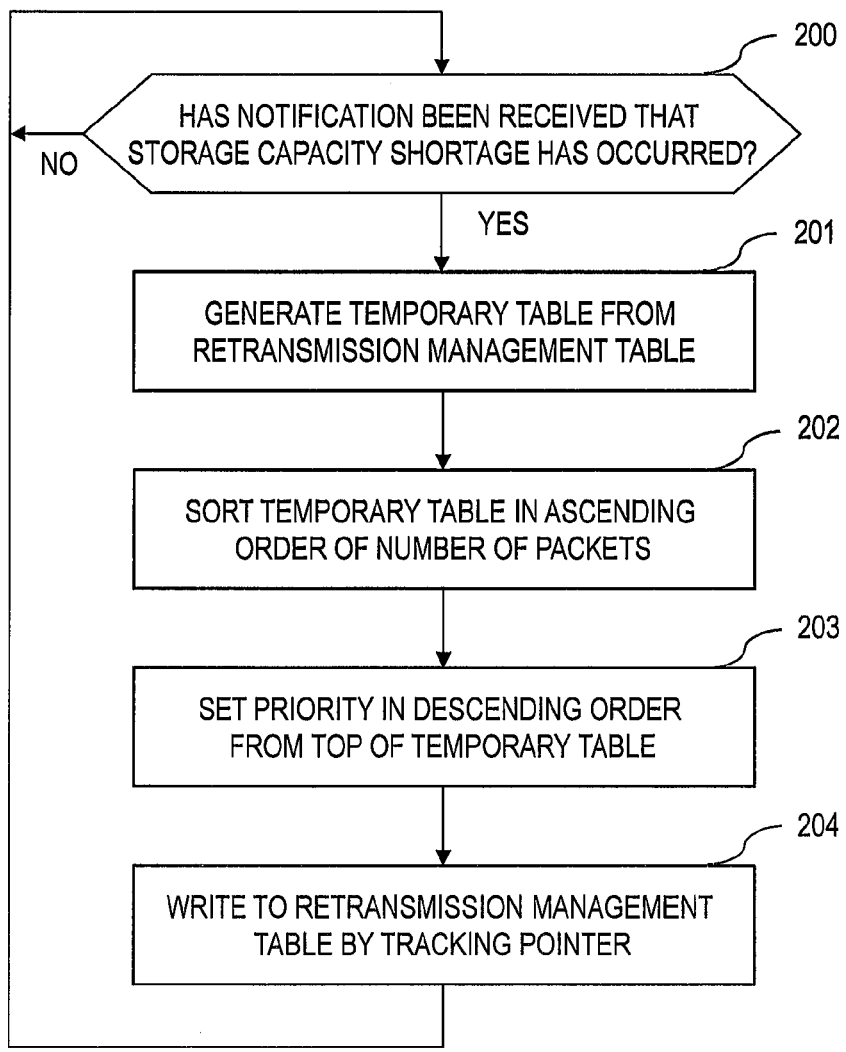
FIG. 11 is an explanatory diagram for illustrating a configuration example of a temporary table according to the second embodiment.
FIG. 12 is a flowchart for illustrating processing executed by a priority setting module according to the second embodiment.

FIG. 11 is an explanatory diagram for illustrating a configuration example of the temporary table 30 according to the second embodiment.

The temporary table 30 includes a pointer (e.g., an entry number of the retransmission management table 15) 210 to each entry in the retransmission management table 15, a number of packets 211 of each block, and a priority 212 of each block.

FIG. 12 is a flowchart for illustrating processing executed by the priority setting module 14 according to the second embodiment.

The priority setting module 14 waits until being notified that the discard detection module 13 has detected that a shortage has occurred in the discarded location storage capacity in the reception terminal 2 (200). In a case where the priority setting module 14 is notified that a shortage has occurred in the discarded location storage capacity, the priority setting module 14 generates the temporary table 30 from the retransmission management table 15 (201). Then, the priority setting module 14 sorts the temporary table 30 in ascending order of the number of packets 211 (202). It should be noted that entries having the same number of packets 211 may be arranged in ascending order of sequence number.

Then, the priority setting module 14 sets the priority 212 so that the priority 212 decreases heading from the top of the temporary table 30 toward the bottom (203). For example, the priority 212 is set based on (number of entries—index number). Lastly, the priority setting module 14 writes the set priority 212 to the retransmission management table 15 by tracking the pointer (204). It should be noted that FIG. 11 is an illustration of a state of the temporary table 30 after the priority 212 has been set.

FIGS. 13A and 13B are each an explanatory diagram for illustrating a configuration example of the retransmission management table 15 in which the priority has been set according to the second embodiment.

FIG. 13A is an illustration of the retransmission management table 15 in a case of managing the received left edge and right edge. FIG. 13B is an illustration of the retransmission management table 15 in a case of managing the left edge and right edge of a location to be retransmitted. The retransmission module 16 retransmits packets based on the priority included in the retransmission management table 15.

As described above, in the second embodiment, in addition to the effects of the above-mentioned first embodiment, because a high priority is set for discarded locations that have a small number of packets to be retransmitted and that include packets having a small sequence number, the discarded location storage capacity of the reception terminal 2 can be more reliably reduced, and as a result, there is a large effect in mitigating storage capacity shortages. In addition, because the priority is set in order of number of packets using the temporary table 30, the processing load for setting the priority can be suppressed.

Third Embodiment

In a third embodiment of this invention, a method of detecting a shortage in the storage capacity in a different manner from that in the first embodiment is described.

In the first embodiment, for some reason, in a case where an ACK packet is received in which all of the SACKs duplicate those of the immediately previous ACK, it may be mistakenly determined that a storage capacity shortage has occurred in the reception terminal 2. Such a phenomenon occurs when, for example, the reception terminal 2 sends a notification that the same packet has been received to the transmission terminal 1 with the same SACK in a case where the reception terminal 2 is employing the standard method defined in RFC 2883, if the same packet as a packet that has already been received is again received. At this point, after the transmission terminal 1 retransmitted the packet already received by the reception terminal 2, the transmission terminal 1 has retransmitted the same packet due to a time out or the like, or a duplication of the packet has occurred on the network. In this case, the reception terminal 2 consecutively sends the ACK packet including the same SACK as a response.

As a countermeasure to this, it is effective to detect a shortage in the storage capacity of the reception terminal 2 by receiving a plurality of ACK packets including the same SACK. However, the number of packets transmitted at a given time varies depending on the transmission control of the transmission terminal 1. Consequently, simple determination based on the number of packets tends to result in over detection of a shortage in the storage capacity when the number of transmitted packets is small, and tends to result in under detection of a shortage in the storage capacity when the number of transmitted packets is large. Therefore, in the third embodiment, fluctuations in the detection capability are suppressed regardless of the number of transmitted packets by detecting a shortage in the storage capacity based on the ratio of the number of ACK packets including the same SACK to the number of transmitted packets as a reference.

In the third embodiment, only the differences from the above-mentioned first and second embodiments are described. Configurations and processes that are the same as in the first and second embodiments are denoted with the same reference numerals, and a description thereof is omitted here.

Figure 14:
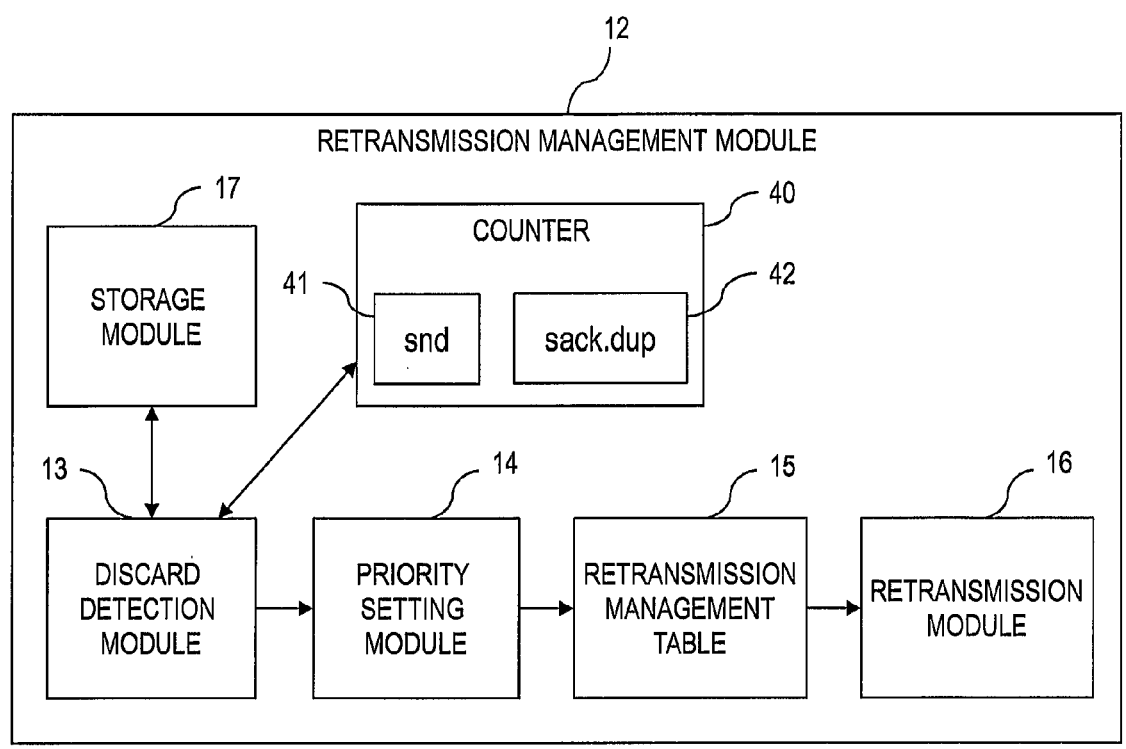
FIG. 14 is a function block diagram of a retransmission management module according to a third embodiment.

FIG. 14 is a function block diagram of the retransmission management module 12 according to the third embodiment.

The retransmission management module 12 according to the third embodiment includes, in addition to the configurations of the retransmission management module 12 according to the above-mentioned first embodiment, a counter 40. The counter 40 includes a transmitted packets counter (snd) 41 and a duplicate SACK counter (sack.dup) 42 for counting the number of packets having a duplicate SACK value.

Figure 15:
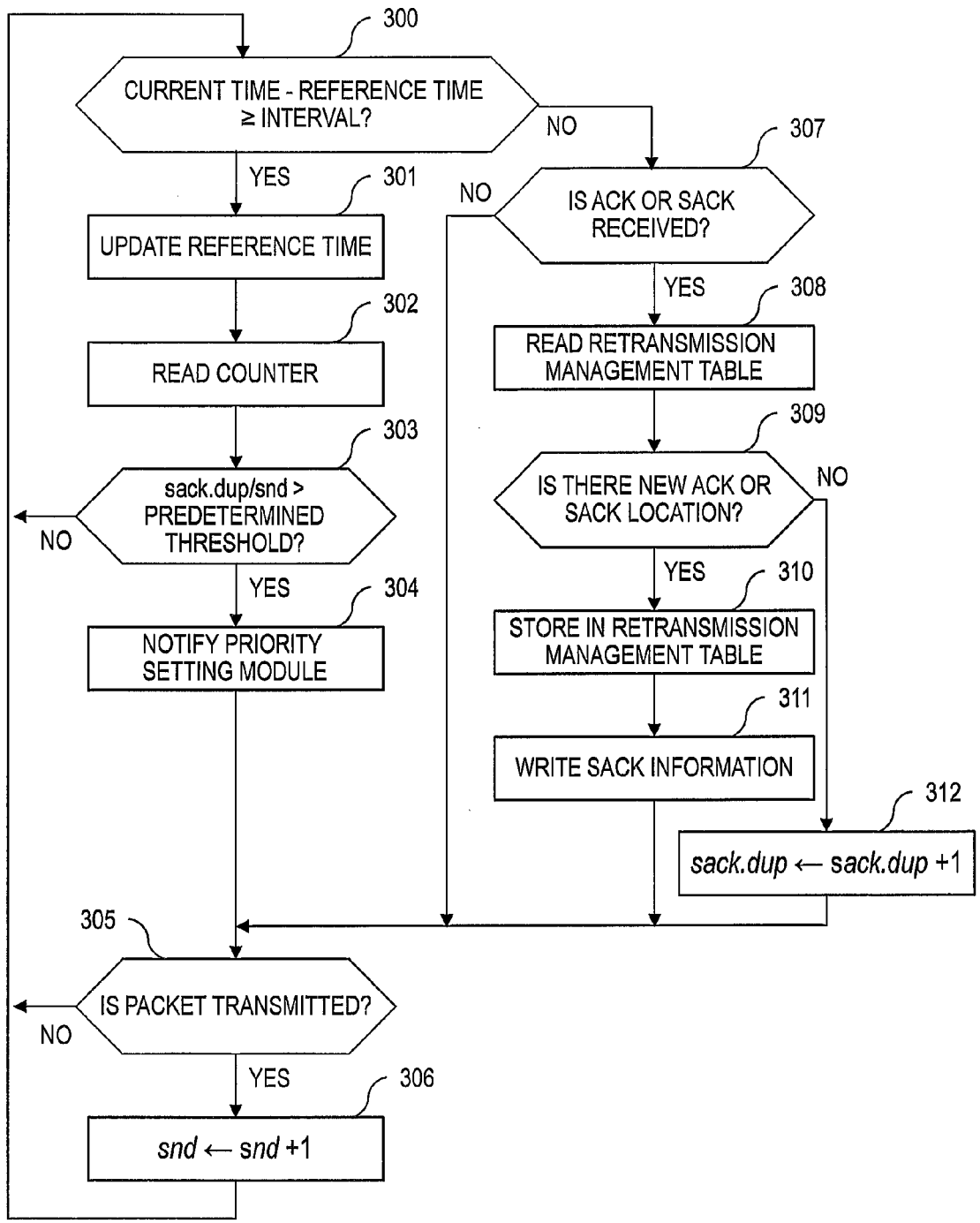
FIG. 15 is a flowchart for illustrating processing executed by a discard detection module according to the third embodiment.

FIG. 15 is a flowchart for illustrating processing executed by the discard detection module 13 according to the third embodiment.

The discard detection module 13 repeatedly (e.g., at each predetermined time) checks whether or not a shortage in the storage capacity of the reception terminal 2 has occurred. Therefore, the discard detection module 13 determines whether or not a difference between the current time and a reference time is a predetermined interval or more (300).

In a case where it is determined that the time difference is the predetermined interval or more, the discard detection module 13 updates the reference time to the current time (301), acquires the counter value (302), calculates the sack.dup/snd, and compares the calculated sack.dup/snd with a predetermined threshold (303).

In a case where it is determined that the calculated sack.dup/snd is more than the predetermined threshold (YES in 303), the discard detection module 13 determines that a shortage in the storage capacity of the reception terminal 2 has occurred, and notifies the priority setting module 14 (304).

In a case where the difference between the current time and the reference time is less than the predetermined interval (NO in 303), the discard detection module 13 determines whether or not an ACK packet or an ACK packet including a SACK has been received (307). As a result, processing can be carried out only in a case where an ACK has been received. In a case where an ACK packet or an ACK packet including a SACK is received (YES in 307), the discard detection module 13 refers to the retransmission management table 15 (308), and determines whether or not a new ACK or SACK has been received (309).

In a case where there is a location for which a new ACK or SACK has been received (YES in 309), the discard detection module 13 stores the received ACK or SACK in the retransmission management table 15 (310), and writes the new SACK information to the storage module 17 (311). On the other hand, in a case where there are no locations for which a new ACK or SACK has been received (NO in 309), the discard detection module 13 adds 1 to the count of the duplicate SACK counter (sack.dup) 42 stored in the storage module 17 (312).

Lastly, in a case where there is a packet to be transmitted, the discard detection module 13 transmits that packet (305), and then adds 1 to the count of the transmitted packets counter (snd) 41 (306).

The method according to the third embodiment can be carried out in combination with not only the method according to the first embodiment, but also in combination with the method according to the second embodiment.

As described above, in the third embodiment, in a case where the ratio between the number of transmitted packets and the number of confirmed response packets is the predetermined threshold or more, a shortage in the discarded location storage capacity is detected. Therefore, even if the reception terminal 2 mistakenly sends the same SACK as a response, the possibility of mistakenly detecting a shortage in the discarded location storage capacity can be reduced.

Fourth Embodiment

In a fourth embodiment of this invention, a method of detecting a shortage in the storage capacity in advance is described.

In the first and third embodiments, the retransmission priority is set after a shortage in the discarded location storage capacity at the reception terminal 2 has occurred. Therefore, until the storage capacity shortage is resolved, new packets that are transmitted are discarded despite the fact that the packets have reached the reception side. Accordingly, in the fourth embodiment, a shortage in the discarded location storage capacity is detected in advance, and the retransmission priority is preliminarily set when a shortage is likely to occur.

In the fourth embodiment, only the differences from the above-mentioned first to third embodiments are described. Configurations and processes that are the same as in the first to third embodiments are denoted with the same reference numerals, and a description thereof is omitted here.

In order to detect a shortage in the discarded location storage capacity of the reception terminal 2, the discard detection module 13 monitors the number of entries in the retransmission management table 15. In a case where the number of entries exceeds a predetermined value, the discard detection module 13 determines that a shortage in the storage capacity is close, and notifies the priority setting module 14 of a storage capacity shortage. The other functions and processes are the same as in the above-mentioned other embodiments.

Figure 16:
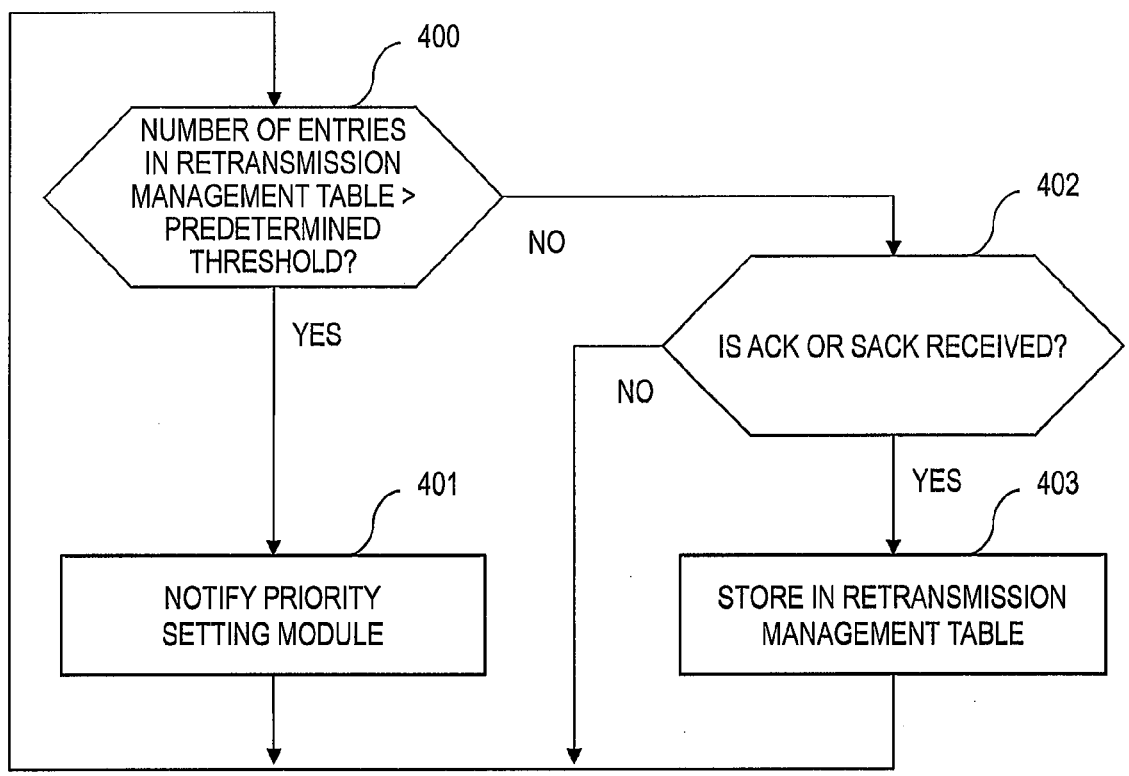
FIG. 16 is a flowchart for illustrating processing executed by a discard detection module according to a fourth embodiment.

FIG. 16 is a flowchart for illustrating processing executed by the discard detection module 13 according to the fourth embodiment.

The discard detection module 13 monitors the number of entries in the retransmission management table 15 (400). In a case where the number of entries in the retransmission management table 15 is a predetermined threshold or more, the discard detection module 13 notifies a shortage in the storage capacity in the reception terminal 2 to the priority setting module 14 (401). On the other hand, in a case where the number of entries in the retransmission management table 15 is less than the predetermined threshold, and when an ACK (or SACK) has been received (402), the discard detection module 13 stores the received ACK (or SACK) in the retransmission management table 15 (403).

The method according to the fourth embodiment can be carried out in combination with any of the methods according to the first to third embodiments.

As described above, in the fourth embodiment, in a case where the number of entries in the retransmission management table 15 is the predetermined threshold or more, it can be predicted the shortage of the discarded location storage capacity, and hence the storage capacity can be reduced and a deterioration in data transfer throughput can be suppressed before a shortage in the storage capacity actually occurs.

Fifth Embodiment

In a fifth embodiment of this invention, an example in which the unique TCP function 6 cannot be implemented is described.

In the first to fourth embodiments, the transmission terminal 1 implements the unique TCP function 6. However, in a case where the unique TCP function 6 cannot be implemented by a transmission terminal 1, as illustrated in FIG. 17, a proxy apparatus 50 including the unique TCP function 6 in the same local area network (LAN) 54 as the transmission terminal 61 may be provided.

In the fifth embodiment, only the differences from the above-mentioned first to fourth embodiments are described. Configurations and processes that are the same as in the first to fourth embodiments are denoted with the same reference numerals, and a description thereof is omitted here.

Figure 17:
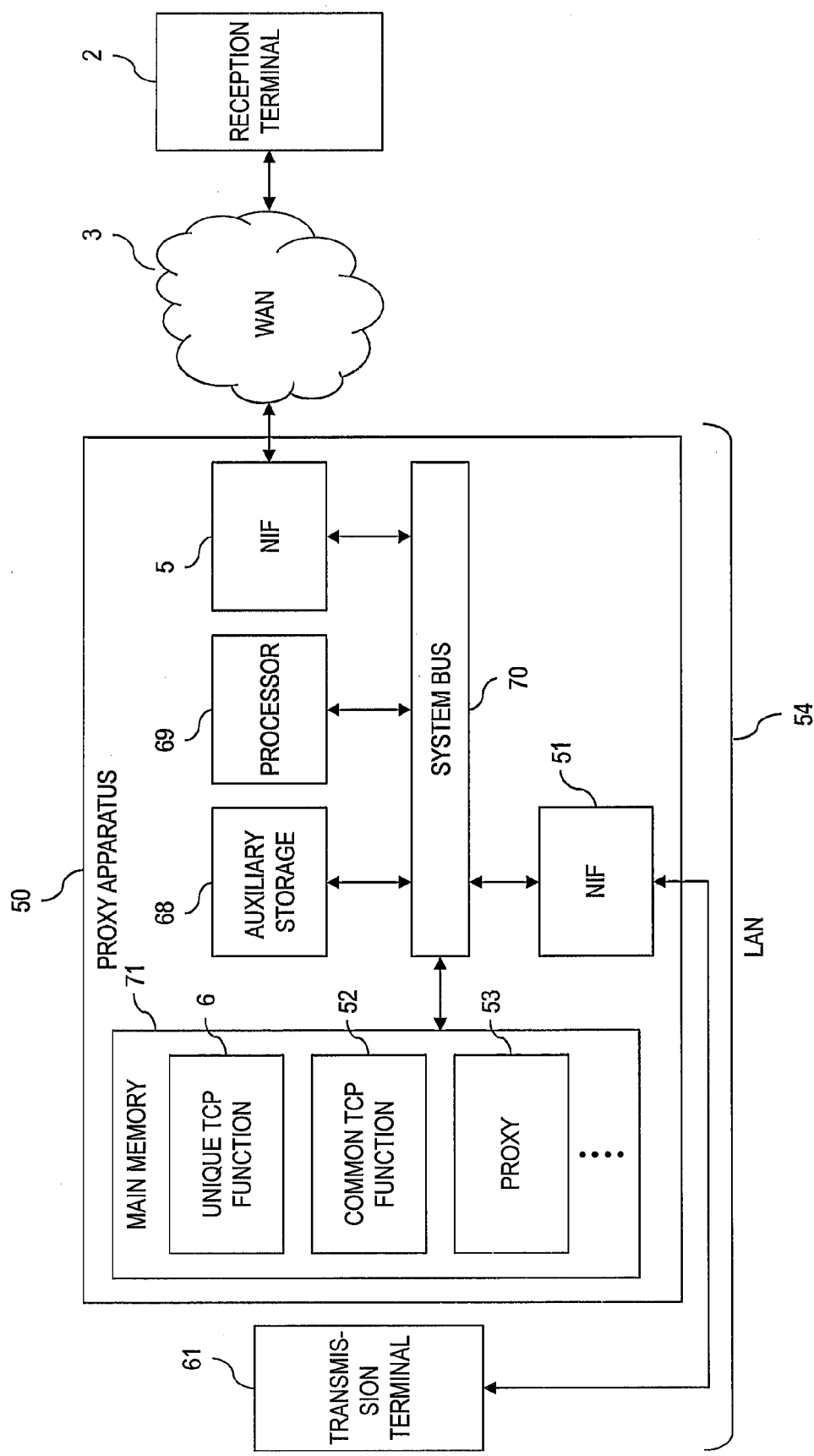
FIG. 17 is a diagram for illustrating a configuration of a system according to a fifth embodiment.
Figure 18:
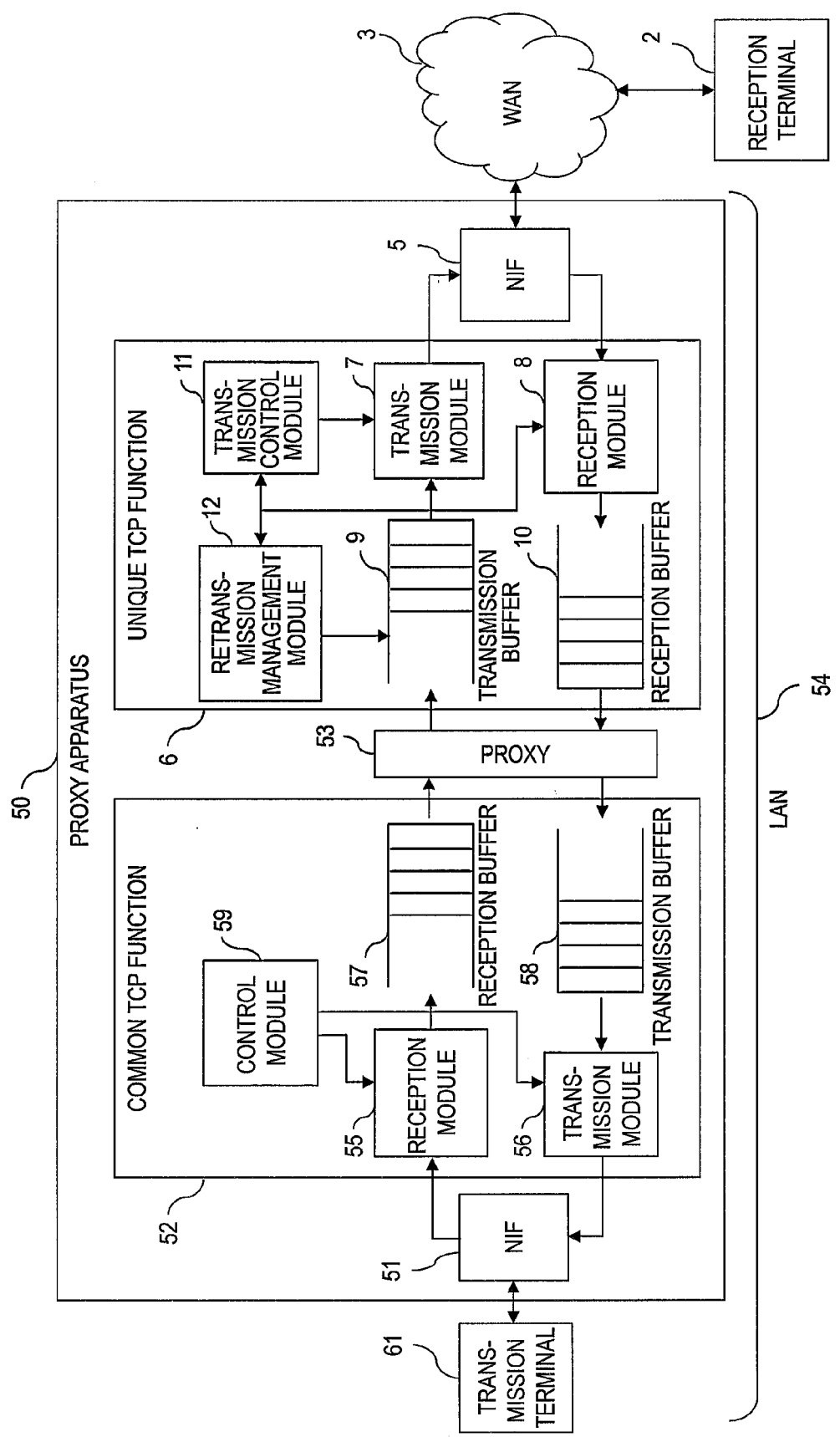
FIG. 18 is a function block diagram of a proxy apparatus according to the fifth embodiment.

FIG. 17 is a diagram illustrating a configuration of a system according to the fifth embodiment. FIG. 18 is a function block diagram of the proxy apparatus 50 according to the fifth embodiment.

The system according to the fifth embodiment includes a transmission terminal 61, a proxy apparatus 50, a WAN 3, and a reception terminal 2.

The proxy apparatus 50 is a computer including at least network interfaces (NIF) 5 and 51, a main memory 71, an auxiliary storage 68, a processor 69, and a system bus 70 coupling each of those devices to each other for transferring data. The main memory 71 temporarily stores programs and data. The auxiliary storage 68 stores programs and data. The processor 69 is configured to execute programs stored in the main memory 71.

The main memory 71 stores a program for the unique TCP function 6, a program for a common TCP function 52, a program for a proxy 53, and the like.

The network interface 51 is an interface for the LAN 54 in order to couple to the transmission terminal 61.

The auxiliary storage 68 is, for example, a non-volatile storage device such as a flash memory or a magnetic storage device. The auxiliary storage 68 stores programs to be executed by the processor 69 and data to be used during program execution. More specifically, the programs executed by the processor 69 are read from the auxiliary storage 68, loaded into the main memory 71, and executed by the processor 69.

The processor 69 is configured to execute a predetermined program. Based on the execution of this program, the unique TCP function 6 controls the transmission data transmitted from the transmission terminal 61. The unique TCP function 6 transmits the transmission data to the network interface 5, and the network interface 5 transmits the transmission data to the WAN 3.

The unique TCP function 6 transfers packets by performing retransmission control based on any one of the above-mentioned embodiments. The configuration of the unique TCP function 6 is, for example, as described above in the first embodiment with reference to FIG. 2.

As illustrated in FIG. 18, the common TCP function 52 includes a LAN side reception module 55, a LAN side transmission module 56, a LAN side reception buffer 57, a LAN side transmission buffer 58, and a LAN side control module 59. The LAN side control module 59 is configured to transfer packets based on a common TCP protocol.

The proxy 53 is configured to exchange data to and from the unique TCP function 6 and the common TCP function 52.

It should be noted that, in FIG. 17, an example is illustrated in which all of the components of the unique TCP function 6 and the common TCP function are configured by software, but a part or all of the components of the unique TCP function 6 and the common TCP function may be implemented in a dedicated LSI by a logic circuit or in the network interface 5.

The programs to be executed by the processor 69 are provided to the proxy apparatus 50 via removable media (CD-ROM, flash memory, etc.) or a network, and stored in the auxiliary storage 68, which is a non-transitory storage medium. Therefore, the proxy apparatus 50 may include an interface (e.g., optical disc drive and USB port) for reading the removable media.

The transmission terminal 61 is a computer including at least the network interface, the main memory, the auxiliary storage, the processor, and the system bus coupling each of those devices to each other for transferring data. The main memory temporarily stores programs and data. The auxiliary storage stores programs and data. The processor is configured to execute programs stored in the main memory.

The main memory stores an application program, application data, and the like.

The auxiliary storage is, for example, a non-volatile storage device such as a flash memory or a magnetic storage device. The auxiliary storage stores programs to be executed by the processor and data to be used during program execution. More specifically, the programs executed by the processor are read from the storage, loaded into the main memory, and executed by the processor.

The processor is configured to execute the application program using the application data. The programs to be executed by the processor are provided to the transmission terminal 61 via removable media (CD-ROM, flash memory, etc.) or a network, and stored in the auxiliary storage, which is a non-transitory storage medium. Therefore, the transmission terminal 61 may include the interface (e.g., optical disc drive and USB port) for reading removable media.

The fifth embodiment can be carried out in combination with the above-mentioned second to fourth embodiments. In other words, in the first to fourth embodiments, the unique TCP function 6 is implemented in the transmission terminal 1. However, in the fifth embodiment, instead of implementing the unique TCP function 6 in the transmission terminal 1, the proxy apparatus 50 that implements the unique TCP function 6 is used, which allows the same effects as those in each of the above-mentioned embodiments to be obtained by using the same unique TCP function 6 as used in each of the above-mentioned embodiments.

As described above, the fifth embodiment includes the proxy function for exchanging data between the unique TCP function 6 and the common TCP function 52. Therefore, data transfer throughput can be improved without needing to perform special implementation in the transmission terminal 1.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit. The above-described configurations and functions may be implemented by software, which means that a processor interprets and executes programs providing the functions.

The information of programs, tables, and files to implement the functions may be stored in a storage device such as a memory, a hard disk drive, or an SSD (Solid State Drive), or a storage medium such as an IC card, or an SD card.

The drawings illustrate control lines and information lines as considered necessary for explanation but do not show all control lines or information lines in the products. It can be considered that almost of all components are actually interconnected.

What is claimed is:

1. A communication apparatus to be coupled to a network, the communication apparatus being configured to:
   transmit data to a correspondent communication apparatus coupled to the network;
   receive an acknowledgement transmitted from the correspondent communication apparatus;
   monitor whether or not a storage capacity shortage for storing discarded locations of transmitted data in the correspondent communication apparatus; and
   retransmit data by setting a retransmission priority for discarded locations in a case of the storage capacity shortage.

2. The communication apparatus according to claim 1, comprising:
   a transmission module configured to transmit packets to the correspondent communication apparatus via the network;
   a reception module configured to receive an acknowledgement packet including information about a selective acknowledgement and information about the acknowledgement from the correspondent communication apparatus via the network;
   a retransmission management table for storing a location to be retransmitted determined from the received acknowledgement packet;
   a detection module configured to detect the storage capacity shortage in the correspondent communication apparatus from the received acknowledgement packet;
   a priority setting module configured to set a priority for a discarded location including a packet to be retransmitted in a case where the detection module detects the storage capacity shortage in the correspondent communication apparatus; and
   a retransmission module configured to retransmit a discarded packet based on the set priority.

3. The communication apparatus according to claim 2, wherein the priority setting unit is configured to set a high priority for a discarded location including a small number of packets to be retransmitted.

4. The communication apparatus according to claim 3, wherein the priority setting unit is configured to:
   set the priority of a discarded location including one packet to be retransmitted to a high value; and
   set the priority of a discarded location including at least two packets to be retransmitted to a low value.

5. The communication apparatus according to claim 3, wherein the priority setting unit is configured to set a high priority for a discarded location including a small number of packets to be retransmitted in order of a small sequence number of a packet included in the discarded location, and set a high priority for a discarded location including a small sequence number of packets to be retransmitted in a case where a number of packets to be retransmitted is the same.

6. The communication apparatus according to claim 5, wherein the priority setting unit is configured to:
   generate a temporary table including a pointer indicating an entry in the retransmission management table, a number of packets to be retransmitted in the entry, and a priority of the entry;
   set a high priority in order of a small number of packets to be retransmitted in the temporary table; and
   write the set priority to the retransmission management table.

7. The communication apparatus according to claim 2, wherein the detection module is configured to detect the storage capacity shortage in the correspondent communication apparatus in a case where the information about the selective acknowledgement and the information about the acknowledgement in consecutive acknowledgement packets all match.

8. The communication apparatus according to claim 2, further comprising:
   a first counter configured to count a number of transmitted packets; and
   a second counter configured to count a number of acknowledgement packets in which the information about the selective acknowledgement and the information about the acknowledgement all match,
   wherein the detection module is configured to detect the storage capacity shortage in the correspondent communication apparatus in a case where a ratio between the number of transmitted packets counted by the first counter and the number of acknowledgement packets counted by the second counter is a predetermined threshold or more.

9. The communication apparatus according to claim 2, wherein
   the detection module is configured to predict the storage capacity shortage in the correspondent communication apparatus in a case where a number of entries in the retransmission management table is a predetermined threshold or more, and
   the priority setting module is configured to set a priority for the packets to retransmitted in a case where the storage capacity shortage is predicted.

10. The communication apparatus according to claim 2, further comprising:
    a common communication function configured to control communication to and from another communication apparatus that uses a common communication method; and
    a proxy function configured to exchange data to and from a communication function for retransmitting packets based on the set priority.

11. A packet transfer method for transferring packets between communication apparatus coupled to a network, the packet transfer method comprising steps of:
    receiving, by a first communication apparatus, an acknowledgement packet including information about a selective acknowledgement and information about an acknowledgement from a correspondent second communication apparatus via the network;
    storing, by the first communication apparatus, a location to be retransmitted determined from the received acknowledgement packet in a retransmission management table;
    detecting, by the first communication apparatus, a storage capacity shortage in the second communication apparatus for storing discarded locations of transmitted data from the received acknowledgement packet;
    setting, by the first communication apparatus, a priority for a discarded location including a packet to be retransmitted in a case where the storage capacity shortage is detected in the second communication apparatus; and
    controlling, by the first communication apparatus, a transmission order of discarded retransmission packets based on the set priority.

12. The packet transfer method according to claim 11, further comprising steps of:
    setting, by the first communication apparatus, a high priority for a discarded location including a small number of packets to be retransmitted; and retransmitting, by the first communication apparatus, the packets based on the set priority.

13. The packet transfer method according to claim 12, further comprising steps of:

setting, by the first communication apparatus, the priority of a discarded location including one packet to be retransmitted to a high value, and the priority of a discarded location including at least two packets to be retransmitted to a low value; and preferentially retransmitting, by the first communication apparatus, the packet of a discarded location including one packet to be retransmitted based on the set priority.

14. The packet transfer method according to claim 12, further comprising a step of setting, by the first communication apparatus, a high priority for a discarded location including a small number of packets to be retransmitted in order of a small sequence number of a packet included in the discarded location, and setting a high priority for a discarded location including a small sequence number of packets to be retransmitted in a case a number of packets to be retransmitted is the same.

15. The packet transfer method according to claim 14, further comprising:

generating, by the first communication apparatus, a temporary table including a pointer indicating an entry in the retransmission management table, a number of packets to be retransmitted in the entry, and a priority of the entry;

setting, by the first communication apparatus, a high priority in order of a small number of packets to be retransmitted in the temporary table; and writing, by the first communication apparatus, the set priority to the retransmission management table.

* * * * *